United States Patent [19]

Nolte

[11] Patent Number: 4,772,483

[45] Date of Patent: Sep. 20, 1988

[54] HOT-PACK, ALL-DAIRY BUTTER SUBSTITUTE AND PROCESS FOR PRODUCING THE SAME

[75] Inventor: James V. Nolte, Godfrey, Ill.

[73] Assignee: Blankebaer/Boweykrimko Corporation, Fenton, Mo.

[21] Appl. No.: 905,503

[22] Filed: Sep. 9, 1986

[51] Int. Cl.⁴ .................................................. A23D 3/00
[52] U.S. Cl. ..................................... 426/604; 426/392; 426/586; 426/603
[58] Field of Search ................ 426/603, 604, 392, 582

[56] References Cited

U.S. PATENT DOCUMENTS

| | | | |
|---|---|---|---|
| 3,366,492 | 1/1968 | Voss et al. | 426/603 |
| 3,962,464 | 6/1976 | Sozzi | 426/603 X |
| 4,005,228 | 1/1977 | Norris | 426/603 X |
| 4,307,125 | 12/1981 | Amer | 426/604 |
| 4,315,955 | 2/1982 | Cramer | 426/604 X |
| 4,414,236 | 11/1983 | Moran et al. | 426/603 X |
| 4,436,760 | 3/1984 | Verhagen et al. | 426/603 |
| 4,438,149 | 3/1984 | Verhagen et al. | 426/603 X |
| 4,511,591 | 4/1985 | Andersson | 426/603 |

*Primary Examiner*—Donald E. Czaja
*Assistant Examiner*—Celine T. Callahan
*Attorney, Agent, or Firm*—Woodard, Emhardt, Naughton, Moriarty & McNett

[57] ABSTRACT

A product and process for preparing the product, an all-dairy butter substitute that tastes like butter and has superior spread characteristics when compared to butter, but contains less calories, fat, and sodium, and more protein, calcium, phosphorus and potassium than butter, comprising a homogenized mixture of cream, non-fat dry milk, salt, locust bean gum, lecithin, mono and diglycerides, citric acid, water and natural flavoring formulated for packaging while the mixture is hot, without the need for subsequent agitation to achieve the desired body when the mixture is cooled.

9 Claims, No Drawings

HOT-PACK, ALL-DAIRY BUTTER SUBSTITUTE AND PROCESS FOR PRODUCING THE SAME

The disclosed invention relates to an all-dairy butter substitute product and process for producing the same.

BACKGROUND OF THE INVENTION

Butter substitutes are well known in the prior art. Best known among several examples would be margarine and the butter/margarine blends that can be found on the shelves of any modern supermarket. These products are relatively high in calories and are not an all-dairy product. U.S. Pat. No. 4,307,125 to Amer discloses a process for the production of low fat butter from cream, but such process requires chilling and working of the product at about 9° to 12° C. subsequent to pasteurization and homogenization and prior to packing, to avoid syneresis. Such a subsequent working after pasteurization increases the risk of contamination, and adds to the cost and complexity of the process.

SUMMARY OF THE INVENTION

One embodiment of the Applicant's invention is a process for producing a hot-pack, all-dairy butter substitute product that tastes like butter and has superior spread characteristics when compared to butter, but contains less calories, fat, and sodium, and more protein, calcium, phosphorus and potassium than butter, including the steps of preparing a mixture of cream, yellow food coloring dye, non-fat dry milk, salt, locust beam gum, lecithin, mono and diglycerides, citric acid, water and natural flavoring; pasteurizing and homogenizing the mixture; thereafter packaging the mixture while above 100° F. into product containers which are then inverted and refrigerated, without further agitation.

Another embodiment of Applicant's invention is the hot-pack, all-dairy butter substitute product produced by the above-described process.

It is an object of the present invention to provide an all-dairy butter substitute product which can be directly packaged when hot and can provide a taste like butter and superior spread characteristics when compared to butter.

It is a further object of the present invention to provide an all-dairy butter substitute containing about 50% less calories and fat, than either butter or margarine.

Related objects and advantages of the Applicant's novel all-dairy butter substitute and process for producing the same will be evident from the following description.

DESCRIPTION OF THE PREFERRED EMBODIMENTS

For the purposes of promoting an understanding of the principles of the invention, reference will now be made to the embodiments and specific language will be used to describe the same. It will nevertheless be understood that no limitation of the scope of the invention is thereby intended, such alterations and further modifications in the described invention, and such further applications of the principles of the invention as described therein being contemplated as would normally occur to one skilled in the art to which the invention relates.

According to the Applicant's invention, a novel all-dairy butter substitute is prepared by a novel process that includes the following steps. Percentages that follow are weight percents.

Cream with a butter fat content of about 40% is added to a conventional processing vat. The cream is placed under agitation. Annatto, a vegetable based food coloring die containing ethyl bixin, is added to the cream to provide butter-like color. The resulting mixture is then heated to about 125° F. and placed under good agitation. To the heated mixture are added salt, mono and diglycerides, non-fat dry milk, locust bean gum, lecithin, and potassium sorbate, through a powder funnel or the like. Citric acid, water, and natural flavoring are also added.

The resulting mixture is then pasteurized and homogenized.

Immediately after homogenization and while the resulting mixture is still hot, the mixture is packaged without being subjected to further agitation. The containers into which the mixture has been packaged are then inverted and are placed into a refrigerated cooler until final development of the product body occurs. The resulting product is the all-dairy butter substitute of Applicant's invention.

For the purpose of promoting a better understanding and to further illustrate the Applicant's invention, reference will now be made in the Example below to the preferred product and process of the Applicant's invention.

EXAMPLE 1

The Applicant's novel all-dairy butter substitute product is prepared utilizing the following ingredients in the approximate weight percents listed (wherein BF means percent butter fat by weight):

TABLE 1

| Ingredients | Weight % |
| --- | --- |
| Cream (40.00% BF) | 96.20 |
| Annatto (coloring) | <0.01 |
| Non-Fat Dry Milk | 0.75 |
| Salt | 1.00 |
| Locust Bean Gum | 0.30 |
| Lecithin | 0.20 |
| Mono & Diglycerides | 1.00 |
| Potassium Sorbate | <0.01 |
| Citric Acid | 0.10 |
| Water | 0.43 |
| Natural Flavoring | 0.01 |

Cream is added to a conventional processing vat and agitation is begun. A trace amount (less than 0.01%) of Annatto is added to the cream in a sufficient amount to impart butter-like color to the end product. The resulting mixture is heated to about 125° F. All dry ingredients, to include the non-fat dry milk, salt, locust bean gum, lecithin, mono- and diglycerides (as an example, Myvatex 820E from Eastman Chemical), and a trace amount of potassium sorbate (less than 0.01%) as a preservative, are added to the heated and agitated mixture through a powder funnel, or the like. To this resulting mixture are added citric acid, water, and natural flavorings of choice (as an example, a mixture of 90% Starter Distillate 15X from Hansen's Lab, Inc. or Chumleas Lab, Inc. and 10% natural diacetyl).

The resulting mixture is batched pasteurized to 180°-185° F. for about 15 minutes. Alternatively, the pasteurizing step may be accomplished by an HTST (high temperature, short time) process at 185°-190° F. at a reduced heating time of about 25-30 seconds.

The pasteurized mixture is then conventionally homogenized at 2,500 psi with the mixture still at a temperature of above 145° F. from the previous pasteurization step. Ideally, homogenization is carried out in a two stage process, with a first stage at 2,000 psi, and a second stage at 500 psi.

Immediately following the homogenizing step and without being subjected to subsequent agitation, the mixture is transferred to a holding vat, from which, while still hot (at least above 100° F.), and preferrably at a temperature of at least 125° F. (most preferrably between 145° F. and 160° F.), the mixture is directly packaged into marketable containers. The sealed containers are then inverted and are cooled without further agitation at refrigerated temperatures. This allows final development of the body of the mixture, which is then the all-dairy butter substitute of the Applicant's invention. The inversion of the containers eliminates condensation effects visible to the consumer upon opening the container, and provides a uniform appearance to the surface of the product.

The Applicant's butter substitute of the present invention has been observed to have a butter-like taste and spreadability superior to that of butter while possessing nutritionally superior characteristics in certain respects over both butter and margarine. The following table compares nutritional information of representative 100 gram samples of butter, margarine, and Applicant's novel all-dairy butter substitute (calculations based upon Revised Handbook #8):

TABLE 2

|  | Butter | Margarine | Butter Substitute |
|---|---|---|---|
| Calories | 726.0 | 720.0 | 374.0 |
| Protein | 0.6 gms | 0.6 gms | 2.3 gms |
| Fat | 81.0 gms | 81.0 gms | 39.9 gms |
| Carbohydrates | 0.6 gms | 0.6 gms | 3.3 gms |
| Calcium | 20.0 mgs | 20.0 mgs | 73.8 mgs |
| Phosphorus | 16.0 mgs | 16.0 mgs | 73.6 mgs |
| Sodium | 987.0 mgs | 987.0 mgs | 428.6 mgs |
| Potassium | 23.0 mgs | 23.0 mgs | 86.6 mgs |
| Cholesterol | 219.0 mgs | — | 144.0 mgs |

What is claimed is:

1. A process for producing an all-dairy butter substitute product that tastes like butter and has superior spread characteristics when compared to butter, but contains less calories, fat, and sodium, and more protein, calcium, phosphorus and potassium than butter, consisting essentially of the following steps:

preparing a mixture of cream with a butter fat content of about 40 weight percent, yellow food coloring dye, non-fat dry milk, salt, locust bean gum, lecithin, mono and diglycerides, citric acid, water and natural flavoring, in effective amounts to produce an all-dairy butter substitute product, by placing the constituents of said mixture under agitation and heat;

pasteurizing said mixture;

homogenizing said mixture;

after said pasteurizing and homogenizing, packaging the mixture while above 100° F. into product containers and inverting said packaged product containers; and refrigerating said mixture subsequent to said packaging step, and avoiding further agitation of said mixture after the packaged mixture ceases to be above 100° F.

2. The process of claim 1 in which said packaging is done with said mixture at above 125° F.

3. The process of claim 2 in which said packaging is done with said mixture at a temperature of between 145° F. and 160° F.

4. The process of claim 1 in which said preparing includes the addition to said cream at about 125° F. of the non-fat dry milk, salt, locust bean gum, lecithin, mono and diglycerides.

5. The process of claim 3 in which said preparing includes the addition to said cream at about 125° F. of the non-fat dry milk, salt, locust bean gum, lecithin, mono and diglycerides.

6. The process of claim 5 wherein the ingredients of said mixture are present in about the following weight percentages:

|  | Weight % |
|---|---|
| Cream (40.00% BF) | 96.20 |
| Annatto (coloring) | <0.01 |
| Non-Fat Dry Milk | 0.75 |
| Salt | 1.00 |
| Locust Bean Gum | 0.30 |
| Lecithin | 0.20 |
| Mono & Diglycerides | 1.00 |
| Potassium Sorbate | <0.01 |
| Citric Acid | 0.10 |
| Water | 0.43 |
| Natural Flavoring | 0.01 |

7. The process of claim 1 wherein said pasteurizing step occurs at a temperature between about 180°–185° F. for 15 minutes.

8. The process of claim 1 in which the avoiding of further agitation of said mixture occurs immediately after said homogenizing step.

9. An all-dairy butter substitute comprising:

| Cream (about 40.00% BF) | about 96.20% |
|---|---|
| Non-Fat Dry Milk | about 0.75% |
| Salt | about 1.00% |
| Locust Bean Gum | about 0.30% |
| Lecithin | about 0.20% |
| Mono & Diglycerides | about 1.00% |
| Citric Acid | about 0.10% |
| Water | about 0.43% |
| Natural Flavoring | about 0.01% | and trace amounts of coloring and potassium sorbate, when produced by the process of claim 1.

* * * * *

UNITED STATES PATENT AND TRADEMARK OFFICE
CERTIFICATE OF CORRECTION

PATENT NO. : 4,772,483

DATED : September 20, 1988

INVENTOR(S) : James V. Nolte

It is certified that error appears in the above-identified patent and that said Letters Patent is hereby corrected as shown below:

In column 1, line 31, the word "beam" should be changed to the word --bean--.

Signed and Sealed this

Tenth Day of January, 1989

*Attest:*

DONALD J. QUIGG

*Attesting Officer*  *Commissioner of Patents and Trademarks*